| 106-89 | AU 113 | EX |
| 5/4/82 | XR | 4,328,145 |

United States Patent [19]
Bobrowski et al.

[11] 4,328,145
[45] May 4, 1982

[54] ADDITIVE FOR AIR-ENTRAINED SUPER PLASTICIZED CONCRETE, CONCRETE PRODUCED THEREBY AND METHOD OF PRODUCING AIR-ENTRAINED SUPER PLASTICIZED CONCRETE

[75] Inventors: Gregory S. Bobrowski, Park Ridge; James D. Connolly, Mt. Prospect, both of Ill.

[73] Assignee: American Admixtures and Chemicals Corporation, Chicago, Ill.

[21] Appl. No.: 88,350

[22] Filed: Oct. 26, 1979

[51] Int. Cl.$^3$ .................. C08L 61/28; C04B 15/00
[52] U.S. Cl. ............................ 524/6; 106/89; 106/90; 524/395
[58] Field of Search ............. 106/90, 314, 89; 260/29.4 R, 39 R, 39 SB, 37 R, 24, 11

[56] References Cited
U.S. PATENT DOCUMENTS
2,993,016  7/1961  Socetti ................. 260/29.4 R

*Primary Examiner*—Theodore E. Pertilla

[57] ABSTRACT

Air entrained, super plasticized concrete having a maximum bubble spacing factor of 0.008 inch (ASTM Standard C 457) and a method for preparing such concrete are disclosed. The method includes the steps of adding an air entraining agent while mixing aggregates and water, adding during the mixing a small but effective quantity of a potassium salt of a fluorinated alkyl carboxylate having a high surface activity and a pH of 8–9, and then adding a super plasticizer to the resulting mix prior to placement. The air entrained concrete having the aforesaid bubble spacing factor contains a super plasticizer, a vinsol resin air entraining agent, and a potassium salt of a fluorinated alkyl carboxylate. The fluorinated alkyl carboxylate is present in an amount of one to two parts per 100 parts of the super plasticizer on a weight basis.

6 Claims, No Drawings

ADDITIVE FOR AIR-ENTRAINED SUPER PLASTICIZED CONCRETE, CONCRETE PRODUCED THEREBY AND METHOD OF PRODUCING AIR-ENTRAINED SUPER PLASTICIZED CONCRETE

This invention relates generally to concrete containing admixtures, and methods of preparation thereof, and specifically to concrete containing both a super plasticizer and an air entraining admixture which eliminates the difficulties encountered heretofore when a super plasticizer and an air entraining admixture were used together.

BACKGROUND OF THE INVENTION

One of the greatest advances in concrete technology in recent decades has been advent of air entrainment. Today the use of entrained air is recommended in concrete for nearly all applications.

Probably the most oft-cited reason for using intentionally entrained air is to improve the resistance of concrete to alternate freezing and thawing. Indeed, tests have proven that air entrained concrete containing minimum recommended air contents on the order of about 5 to 7.5%, ±1%, air content (expressed as a percent by volume) will withstand up to about 1900 freeze-thaw cycles as contrasted to a maximum of about 150 cycles of a non-air entrained concrete which is identical in all other respects. See for example, "Air-Entrained Concrete", Portland Cement Association, Document ISO45.02T, 1967.

There are many other benefits from the use of air entrained concrete including improved workability, increased resistence to de-icers such as calcium chloride, increased sulfate resistance, and improved water tightness.

One widely used method of making air entrained concrete includes the step of adding an air-entraining admixture during the mixing of the concrete. Experience has indicated that the mixing action is the most important factor in the production of air-entrained concrete, and in this regard uniform distribution of entrained air voids is essential to the production of scale-resistent concrete; non-uniformity is always a risk if the entrained air is inadequately dispersed during mixing. Such factors as the batch size of the concrete being mixed, the condition of the mixer and the rate of mixing are also important. Over mixing may even result in a loss of some of the entrained air, but the techniques and preferred procedures associated with the mixing phase of air entrained concrete are now rather widely understood, and further amplification is considered unnecessary for those skilled in the art.

A number of air-entraining admixtures manufactured from a variety of materials are commercially available today. One readily available air-entraining admixture is AMEX, a product available from American Admixtures Corporation, which is obtained in the production of a neutralized vinsol resin solution.

Indeed, vinsol resins are undoubtedly the most widely used air-entraining admixture in the United States, although other air-entraining products are also available.

The air-entrained concrete which results from the use of recognized air-entraining products contain a large number of air bubbles of an extremely small size; average bubble diameter usually ranges from three thousandths to six thousandths of an inch and as many as three hundred to five hundred billion bubbles may be present in a cubic yard of air-entrained concrete having an air content in the range of four to six percent by volume, and one and one-half inch maximum sized aggregate. The bubbles are not interconnected and are well distributed throughout the cement/water phase. The spacing of the air voids is an important factor in the freeze-thaw durability of hardened concrete, and a spacing of less than 0.008 inches, as measured by ASTM C457 standard, is considered essential for the attainment of the requisite freeze-thaw resistence.

One of the most significant developments in concrete since air-entrained concrete was developed in the mid-1930's is the use of so-called super plasticizers.

Super plasticizers are chemical compounds which, when added to concrete, fluidize the concrete for a period of time so that (1) normal workability can be obtained in concrete having much lower water-cement ratios then would normally be employed or (2) extremely workable "flowing concrete" (that is essentially self-leveling without undesirable side effects, such as segregation, low-durability, low abrasion resistence, and bleeding,) can be obtained, or (3) a combination of (1) and (2). One commercially available product is MELMENT which is obtainable from American Admixtures Corporation, and which is a modified polycondensate product of melamine and formaldehyde, and does not contain any calcium chloride or any other accelerating salts.

Super plasticized concrete is extensively used in cast-in-place concrete work where extreme flowing characteristics are required such as in areas of high density of reinforcement, pumping, and in complicated form work.

Among the advantages of the use of super plasticizers in pre-cast and readi-mix concrete are (a) increased strength at all ages, (b) improved resistance to attack by sulphates, (c) increased bonding to reinforcing steel, (d) improved workability and formability, and (e) reduced permeability to water penetration.

When MELMENT is added to a concrete mix, the plasticizing effects last for approximately 30–60 minutes, depending on the job conditions. Consequently it should be added at the job site when used in ready-mixed concrete.

MELMENT is normally batched at 35–70 fluid ounces per cwt of Portland Cement for pre-cast work and at 20–40 fluid ounces per cwt of Portland Cement for ready-mix concrete. An additional dose may be added to a batch to restore flow characteristics which may have dissipated due to failure to place the batch within the normal fluidizing period.

The literature in the trade states that several chemicals purport to have the high workability characteristics required in a super plasticizer, but two main groups are well recognized. They are (1) sulfonated melamine formaldehyde condensates, and (2) sulfonated napthalane formaldehyde condensates. Additionally, certain modified lignosulfonates are said to super plasticize. At least twelve proprietary super plasticizers are currently available in the world, eight of which belong to the two categories (1) and (2) immediately above.

Super plasticized concrete may be placed rapidly and easily and, frequently, without vibration or, at least with reduced vibration over what would normally be required.

Additional characteristics of super plasticized concrete are set out in "Super Plasticized Concrete," ACI Journal, May, 1977, , pp. N6-N11 inclusive, and the references set out therein.

Although concrete which may be classified as either air entrained or super plasticized has proved eminently feasible for many applications requiring only the qualities attributable to air entrainment or super plasticization, difficulties have been encountered when the contractor has attempted to use both an air-entraining admixture and a super plasticizer.

Specifically, it is today an universally accepted fact that the air-void system of hardened air-entrained concrete containing super-plasticizers and neutralized vinsol resin is very poor; that is, the air-void spacing factor is greater than 0.008 inches. As mentioned, the air-void parameters, and specifically the spacing factor of the air-void system, is a major criteria for predicting the probable performance of concrete to withstand repeated freeze-thaw cycling.

The problem, then, faced by the industry is to produce a concrete which possesses the desirable freeze-thaw and allied characteristics of air entrained concrete, together with the excellent workability and increased strengths of super plasticized concrete.

Accordingly a primary object of the invention is to provide an air-entrained, super plasticizing additive for concrete.

Another object is to provide a concrete having the desirable freeze-thaw characteristics, and allied characteristics of air-entrained concrete, together with the excellent workability, increased strengths, and allied characteristics of super-plasticized concrete, and a method for producing same.

DESCRIPTION OF THE INVENTION

An improved air-void system in concrete containing a super plasticizer has been attained by using a very small amount of a fluorochemical surfactant. The compound found most effective to date is a fluorinated hydrocarbon, which is characterized by its outstanding surface activity. Specifically, a potassium salt of a fluorinated alkyl carboxylate has yielded surprising and effective results.

Set out below are the optimum proportion of the fluorocarbon additive which, when mixed with a super plasticizer, such as MELMENT, has resulted in a concrete having the desirable properties associated with both air-entrained and super plasticized concrete taken separately.

Two and three quarter ounces of a six percent aqueous solution of a fluorinated hydrocarbon as described above, and specifically a product known by the trade designation FC-128, which is available from the 3M Corporation, is made basic with caustic soda to attain pH of 8-9.

Thereafter the aforesaid two and three quarter ounces of the fluorinated hydrocarbon is added to 155 ounces of 20 percent liquid MELMENT.

The unexpected benefits of the addition of a small quantity of a flouronated hydrocarbon to a super plasticizer can be appreciated from the following discussion.

Referring first to Table I, air-void parameters are there listed or reference concrete containing vinsol resin based air-entraining agents. All of the mixes were rodded except mix number No. MAV-19 which was vibrated. All the mixes contained Chicago based AMEX, a vinsol resin air-entrained-admixture, with the exception of mix A.E.A.-5-78 which had a St. Louis based AMEX, and A.E.A.-6-78 which had a vinsol resin based air training agent offered under the trade name SKW.

In all cases, the air-entraining agent was added in the beginning of the mixing cycle to the aggregates and water.

TABLE I

| | | | | | | Specific | Avg. | Paste Air | Spacing Factor L | |
|---|---|---|---|---|---|---|---|---|---|---|
| | | Slump | Plastic | Hardened | Voids Per | Surface | Chord | Ratio | | |
| Mix. No. | Mix | In. | Air % | Air % | Inch (n) | $In^2/In^3$ | In. | P/A | Inches | mm |
| MAV-1 | Reference 5¼ Amex | 4¼ | 4.7 | 4.29 | 11.166 | 1041 | 0.00384 | 6.3 | 0.0050 | 0.1270 |
| MAV-15 | Reference 5¼ Amex | 5¼ | 5.8 | 7.00 | 14.05 | 804 | 0.00498 | 3.77 | 0.0047 | 0.1194 |
| IPS-8 | Reference 5¼ Amex | 5 | 5.6 | 5.9 | 11.069 | 750 | 0.00533 | 4.5 | 0.0058 | 0.1473 |
| MAV-16 | Reference 5¼ Amex | 5¼ | 4.7 | 4.6 | 7.283 | 633 | 0.00632 | 5.8 | 0.0073 | 0.1854 |
| MAV-19 | Reference 5¼ Amex Vibrated | 5¼ | 4.0 | 3.1 | 7.290 | 953 | 0.0042 | 8.99 | 0.0062 | 0.1575 |
| MAV-25 | Reference 5¼ Amex | 5 | 5.2 | 4.75 | 12.299 | 1036 | 0.00386 | 5.68 | 0.0045 | 0.1143 |
| AEA 7-78 | Reference 5¼ Amex | 4 | 5.9 | 5.50 | 15.744 | 1146 | 0.00349 | 4.8 | 0.00397 | 0.1008 |
| AEA 5-78 | Reference 5¼ St. Louis Amex | 4 | 6.1 | 6.07 | 18.909 | 1193 | 0.00335 | 4.32 | 0.00346 | 0.0879 |
| AEA 6-78 | Reference 5¼ SKW A.E.A. | 4 | 6.4 | 6.99 | 19.380 | 1109 | 0.00361 | 3.69 | 0.00333 | 0.0846 |
| AEA 8-78 | Reference | 4¼ | 6.0 | 6.02 | 14.885 | 989 | 0.00404 | 4.25 | 0.00430 | 0.1092 |

Table II lists the air-void parameters of concrete containing a modified polycondensation product of melamine and formaldehyde, and a vinsol resin air-entraining agent.

Mix No. MAV-7 contained Lomar D at an addition rate equal in solids to the reference super plasticizer at 30 ounces per 100 lbs. of cement. This Table II includes results for flowing and nonflowing concrete as well as rodding versus vibration. The air entraining agent, AMEX, was added early in the mixing cycle, that is it was added to aggregate the water, for all mixes except for MAV-26 which has AMEX added at the end of the mix cycle.

The overall results show a low quality air-void system, with the result that the freeze-thaw durability which might otherwise be expected, considering the amount of air entraining agents used, would not be attained.

It will be noted that the fluorinated hydrocarbon is used at a ratio of about 1.5 parts of fluorinated hydrocarbon to 100 parts of the modified polycondensate product of melamine and formaldehyde on a weight basis.

Under some field conditions, it may be possible to use less fluorinated hydrocarbon, or an equivalent amount of an equally effective alternative compound, although it is currently believed that if the fluorinated hydrocarbon is present in an amount much less then at a rate of

TABLE II

MELMENT AIR-VOID SYSTEM

| Mix No. | Mix | Slump In. | Plastic Air % | Hardened Air % | Voids Per Inch (n) | Specific Surface In²/In³ | Avg. Chord In. | Paste Air Ratio P/A | Spacing Factor L Inches | mm |
|---|---|---|---|---|---|---|---|---|---|---|
| MAV-2C | 5¼ Amex 42 oz. Mel. | 4¼ rodded | 5.3 | 5.79 | 6.857 | 474 | 0.00844 | 4.34 | 0.00915 | 0.2324 |
| MAV-17 | 5¼ Amex 27 oz. Mel. | 5 rodded | 5.0 | 3.35 | 6.112 | 667 | 0.0060 | 7.85 | 0.0085 | 0.2159 |
| MAV-18 | 5 Amex 27 oz. Mel. | 10 flowing rodded | 5.4 | 5.05 | 8.588 | 680 | 0.00588 | 5.35 | 0.0071 | 0.1803 |
| MAV-20 | 5¼ Amex 27 oz. Mel. | 5 vibrated | 5.6 3.8@ | 3.12 | 7.044 | 963 | 0.00443 | 8.33 | 0.0060 | 0.1524 |
| MAV-21 | 5¼ Amex 27 oz. Mel. | 10 flowing vibrated | 5.6 3.4@ | 5.68 | 7.536 | 531 | 0.00754 | 4.91 | 0.0088 | 0.2235 |
| MAV-22 | 5¼ Amex 30 oz. Mel. | 5 rodded | 5.9 | 6.27 | 7.299 | 466 | 0.00859 | 3.907 | 0.0087 | 0.2210 |
|  | 5¼ Amex 30 oz. Mel. | 5 vibrated | 4.4 | 4.36 | 5.759 | 528 | 0.00757 | 5.71 | 0.0090 | 0.2286 |
| MAV-26 | 5¼ Amex 30 oz. Mel. Amex added last | 5 | 6.2 | 5.01 | 8.9439 | 714 | 0.00560 | 4.93 | 0.0063 | 0.1600 |
| MAV-7 | 5¼ Amex 19 oz. Lomar D | 7 | 5.0 | 4.49 | 5.33 | 475 | 0.00842 | 5.59 | 0.0104 | 0.2642 |

Table III lists the air-void parameters of concrete containing a vinsol resin based air entraining agent and the super plasticizer used in the specific examples in Table II, except that the super plasticizer has been modified by the addition of two and three quarter ounces of six percent aqueous solution of a fluorinated hydrocarbon, and specifically a potassium salt of a fluorinated alkyl carboxylate, which is made basic with caustic soda to attain a pH of 8-9 and thereafter mixed with 155 ounces of 20% liquid super plasticizer as above described.

Mix No. MAV-23 was non-flowing concrete for both rodded and vibrated. Mix No. 24 contained a flowing concrete with delayed addition of super plasticizer, the super plasticizer being added after 20 minutes for both rodded and vibrated concrete.

The overall results of this Table show a marked improvement of the air void system.

about one part by weight of fluorinated hydrocarbon, or an equally effective equivalent compound, to one hundred parts by weight of the modified polycondensate product of melamine and formaldehyde, the desired bubble spacing factor of 0.008 in. will not be achieved on a consistent basis.

Further, it may be advantageous to use more fluorinated hydrocarbon, or an equally effective equivalent compound, to provide a factor of safety in certain applications, and especially critical applications such as bridge work. However, if the fluorinated hydrocarbon, or an equally effective equivalent compound, is present in an amount much greater than at a rate of about two parts by weight of fluorinated hydrocarbon, or an equally effective equivalent compound, to one hundred parts by weight of the modified polycondensate product of melamine and formaldehyde, the desired bubble spacing factor of 0.008 in. will nearly invariably be achieved, and the cost of amounts greater than about 2:100 may not be cost justifiable.

TABLE III

MELMENT L10A AIR-VOID SYSTEM

| Mix. No. | Mix | Slump In. | Plastic Air % | Hardened Air % | Voids Per Inch (n) | Specific Surface In²/In³ | Avg. Chord In. | Paste Air Ratio P/A | Spacing Factor L Inches | mm |
|---|---|---|---|---|---|---|---|---|---|---|
| MAV-11 | 5 Amex 30 oz. L10A | 5 | 6.7 | 7.4 | 14.00 | 756 | 0.00529 | 25/7.4 | 0.0042 | 0.1067 |
| MAV-12 | 5 Amex 30 oz. L10A | 5¼ | 6.8 | 7.4 | 13.00 | 703 | 0.00569 | 25.5/7.4 | 0.0046 | 0.1168 |
| MAV-13 | 5¼ Amex 30 oz. L10A | 5¼ | 6.4 | 6.57 | 9.67 | 589 | 0.00679 | 25.5/6.57 | 0.0064 | 0.1626 |

TABLE III-continued

MELMENT L10A AIR-VOID SYSTEM

| Mix. No. | Mix | Slump In. | Plastic Air % | Hardened Air % | Voids Per Inch (n) | Specific Surface In²/In³ | Avg. Chord In. | Paste Air Ratio P/A | Spacing Factor L Inches | mm |
|---|---|---|---|---|---|---|---|---|---|---|
| MAV-23 | 5½ Amex 30 oz. L10A | 4¾ rodded | 5.0 | 5.04 | 9.10 | 722 | 0.00550 | 5.02 | 0.0063 | 0.1600 |
|  | 5½ Amex 30 oz. L10A | 4¾ vibrated | 3.6 | 3.64 | 7.48 | 822 | 0.00487 | 7.01 | 0.0063 | 0.1600 |
| MAV-24 | 5½ Amex 30 oz. L10A added after 20 min. old | 10 flowing rodded | 4.8 | 4.46 | 8.677 | 778 | 0.00514 | 5.96 | 0.0065 | 0.1651 |
|  |  | 10 flowing vibrated | 3.9 | 3.97 | 7.012 | 707 | 0.0057 | 6.85 | 0.0074 | 0.1880 |
| MAV-27 | 5½ Amex 30 oz. L10A | 5 | 5.5 | 4.2 | 9.145 | 871 | 0.00459 | 6.05 | 0.0057 | 0.1448 |

Particular attention is directed to a comparison of the Spacing Factor in the mixes of Table II with those of the mixes of Table III.

Specifically, six of the nine mixes in Table II did not possess an acceptable Spacing Factor, and the Spacing Factor of one of the three acceptable mixes was near the upper limit of acceptability.

By contrast, all eight of the mixes in Table III fell well within the acceptable range of a Spacing Factor of up to 0.008 inches, with only mix MAV-24, vibrated, lying near the upper end of the limit of acceptability.

In all cases, the entrainment agent was added in the beginning of the mixing cycle; that is, to the aggregate and water mixture.

As used in this specification, including the appended claims, the term "concrete" is used to refer to a hard, strong building material composed of a cementing material, usually Portland cement, and a mineral aggregate, such as washed stone and gravel or broken rock, the cementing material having been mixed with sufficient water to cause the cementing material to set and bind the mineral aggregate.

Although a preferred embodiment of the invention has been described, it will be at once apparent to those skilled in the art that various modifications may be made within the spirit and scope of the invention.

Accordingly, it is intended that the scope of the invention be defined, not by the statement of the precise compositions set out herein, but rather by the scope of the appended claims when interpreted in light of the pertinent prior art.

What is claimed is:

1. In the method of preparing an air entrained, super plasticized concrete having a bubble spacing factor of a maximum of 0.008 in. as defined by ASTM standard C457 the steps of
    adding an air entraining agent during the mixing cycle of the aggregates and water,
    adding a small but effective quantity of a potassium salt of a fluorinated alkyl carboxylate characterized by high surface activity and a pH of 8–9 during the mixing cycle of the aggregates and water, and
    adding a super plasticizer to the mix at the time sufficiently close to placement of the mix that the super plasticizer will retain its effectivness during placement.

2. The method of preparing an air entrained, super plasticized concrete having a bubble spacing factor of a maximum of 0.008 in. as defined in ASTM standard C457 of claim 1 characterizea in that the fluorinated alkyl carboxylate is added to the super plasticizer prior to the addition of either to the mix of aggregates and water.

3. The method of preparing an air entrained, super plasticized concrete having a bubble spacing factor of a maximum of 0.008 in. as defined in ASTM standard C457 of claim 1 further characterized in that the super plasticizer is a modified polycondensate product of melamine and formaldehyde and the potassium salt of a fluorinated alkyl carboxylate is present in an amount of from about one to two parts of said potassium salt of a fluorinated alkyl carboxylate to 100 parts of the modified polycondensate product of melamine and formaldehyde on a weight basis.

4. The method of preparing an air entrained, super plasticized concrete having a bubble spacing factor of a maximum of 0.008 in. as defined in ASTM standard C457 of claim 3 further characterized in that the potassium salt of a fluorinated alkyl carboxylate is present in an amount of about 1.5 parts thereof to 100 parts of said modified polycondensate product of melamine and formaldehyde on a weight basis.

5. Air entrained concrete having a bubble spacing factor of a maximum of 0.008 in. as defined by ASTM Standard C457 and containing a super plasticizer, a vinsol resin air entraining agent, and a potassium salt of a fluorinated alkyl carboxylate which had, in a plastic state, high surface activity and a pH of 8–9; said fluorinated alkyl carboxylate being present in an amount of one to two parts per 100 parts of said super plasticizer on a weight basis.

6. The air entrained concrete of claim 5 further characterized in that said potassium salt of a fluorinated alkyl carbonate is present in an amount of about 1.5 parts thereof to 100 parts of said super plasticizer, which super plasticizer is a modified polycondensate product of malamine and formaldehyde on a weight basis.

* * * * *